United States Patent
Inhetveen

(10) Patent No.: US 11,486,654 B2
(45) Date of Patent: Nov. 1, 2022

(54) ARRANGEMENT FOR STORING THERMAL ENERGY

(71) Applicant: Siemens Gamesa Renewable Energy GmbH & Co. KG, Hamburg (DE)

(72) Inventor: Patrick Inhetveen, Pattensen (DE)

(73) Assignee: SIEMENS GAMESA RENEWABLE ENERGY GMBH & CO. KG

( * ) Notice: Subject to any disclaimer, the term of this patent is extended or adjusted under 35 U.S.C. 154(b) by 0 days.

(21) Appl. No.: 16/763,162

(22) PCT Filed: Nov. 14, 2018

(86) PCT No.: PCT/EP2018/081142
§ 371 (c)(1),
(2) Date: May 11, 2020

(87) PCT Pub. No.: WO2019/096809
PCT Pub. Date: May 23, 2019

(65) Prior Publication Data
US 2020/0278157 A1 Sep. 3, 2020

(30) Foreign Application Priority Data
Nov. 16, 2017 (EP) .................................. 17202011

(51) Int. Cl.
*F28D 20/00* (2006.01)
(52) U.S. Cl.
CPC .. *F28D 20/0056* (2013.01); *F28D 2020/0091* (2013.01); *Y02E 60/14* (2013.01)
(58) Field of Classification Search
CPC .............................. F28D 20/0056; Y02E 60/14
(Continued)

(56) References Cited

U.S. PATENT DOCUMENTS 3,949,527 A * 4/1976 Double ............... E04B 1/34347
52/4
4,897,970 A * 2/1990 Double ................... A01F 25/13
52/4
(Continued)

FOREIGN PATENT DOCUMENTS

CN 101303207 B 6/2010
DE 2721173 A1 11/1978
(Continued)

OTHER PUBLICATIONS

European Search Report and Written Opinion of the European Searching Authority dated Apr. 30, 2018 for Application No. 17202011.7.
(Continued)

*Primary Examiner* — Leonard R Leo
(74) *Attorney, Agent, or Firm* — Schmeiser, Olsen & Watts LLP

(57) ABSTRACT

An arrangement for storing thermal energy, which has a three-dimensionally configured heat accumulator is provided. The latter contains a solid natural material for heat storage. The heat-storage material is enclosed by a fluid-impermeable, flexible layer such that the heat-storage material is insulated at least in a pressure-tight manner with regard to the environment of the heat accumulator. A flexible cover layer is provided, which is coupled to the fluid-impermeable flexible layer such that the flexible cover layer applies a surface force to the fluid-impermeable flexible layer. As a result, the fluid-impermeable flexible layer is pressed areally onto the heat-storage material. The flexible cover layer (i) has the form of a mesh or (ii) is configured in the form of sheet-metal plates overlapping one another in an imbricated manner.

6 Claims, 7 Drawing Sheets

(58) Field of Classification Search
USPC .................................................. 165/45; 52/4
See application file for complete search history.

(56) References Cited

U.S. PATENT DOCUMENTS

| | | | | |
|---|---|---|---|---|
| 6,994,156 | B2* | 2/2006 | Kopko | ................ F28D 20/0043 165/45 |
| 9,557,079 | B2* | 1/2017 | Von Herzen | ............ F24T 10/30 |
| 2009/0211726 | A1 | 8/2009 | Bank et al. | |
| 2012/0012276 | A1* | 1/2012 | Von Herzen | ............ F24T 10/30 165/45 |

FOREIGN PATENT DOCUMENTS

| | | | | |
|---|---|---|---|---|
| DE | 2949584 | A1 * | 6/1981 | ......... F28D 20/0056 |
| DE | 3124021 | A1 | 1/1983 | |
| JP | 2014055762 | A | 3/2014 | |
| WO | 2016150462 | A1 | 9/2016 | |
| WO | 2017055475 | A1 | 4/2017 | |

OTHER PUBLICATIONS

International Search Report and Written Opinion of the International Searching Authority dated Jan. 15, 2019 for Application No. PCT/EP2018/081142.
Chinese Office Action for Application No. 201880074229.6, dated Apr. 2, 2021.

* cited by examiner

FIG 2
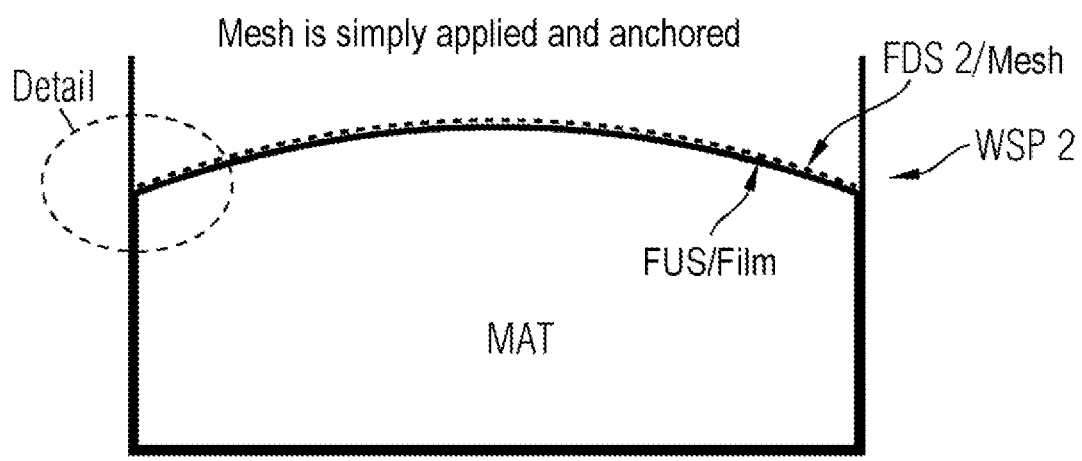
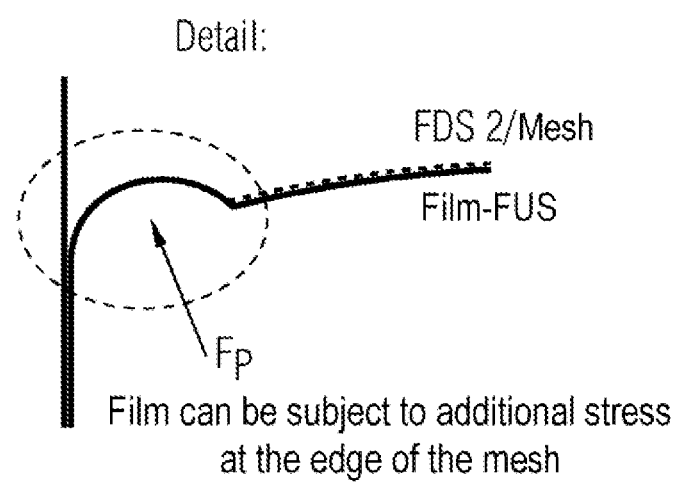

ARRANGEMENT FOR STORING THERMAL ENERGY

CROSS-REFERENCE TO RELATED APPLICATIONS

This application claims priority to PCT Application No. PCT/EP2018/081142, having a filing date of Nov. 14, 2018, which is based off of EP Application No. 17202011.7, having a filing date of Nov. 16, 2017, the entire contents both of which are hereby incorporated by reference.

FIELD OF TECHNOLOGY

The following relates to an arrangement for storing thermal energy.

BACKGROUND

When an energy-supply grid involves a high proportion of renewable energy (wind energy, solar energy, tidal energy, etc.), intermediate storage of the renewable energy increasingly assumes greater importance, with the aim of achieving an appropriate relationship between availability of the renewable energy and the requirements of grid stability and consumer behavior.

After electrical energy has been generated it can be converted into thermal energy (heat) and placed into intermediate storage for a limited period in a heat-storage system.

There are known heat-storage systems in which solid materials are used as storage material—an example being rock or ceramic or cobble. A heated fluid—for example electrically heated air—is used as heat-transfer medium and passed into the heat-storage system. The solid storage material of the heat-storage system is heated and used for temporary energy storage.

Correspondingly, for extraction of energy from the heat-storage system a (cool) fluid such as air is injected into the heat-storage system and heated therein and then introduced into a converter system. The converter system converts the thermal energy extracted by the fluid (air) from the heat-storage system into electrical energy.

By way of example, with the aid of the heated air the thermal energy extracted is converted to electrical energy by way of a steam circuit and with use of a steam turbine.

A competitive high-efficiency energy-storage system must ensure high steam parameters (temperature T, power output P). This can be achieved only if thermal energy is stored with use of high temperatures. The material used for storage therefore has exposure to large and sometimes rapid temperature fluctuations and must therefore withstand the resultant stresses (e.g. thermal and mechanical stresses).

The material used for storage can be isolated/sealed from the environment of the heat-storage system by a flexible fluid-impermeable layer. By way of example, an airtight film is used for this purpose, being arranged in a manner that maintains pressure/temperature within the heat-storage system.

By virtue of close contact with the material used for storage, this flexible fluid-impermeable layer is exposed to the same large and sometimes rapid temperature fluctuations and must therefore likewise be able to withstand the resultant stresses.

At the same time, this flexible fluid-impermeable layer must ensure that the total volume used in operating mode of the heat-storage system is maintained in order to avoid undesired effects within the heat-storage system (e.g. non-uniform temperature distribution within the volume of the storage system, or formation of undesired channels in the interior of the heat-storage system or material thereof).

Because of the desired function of the fluid-impermeable layer, and in view of its flexibility, it is necessary to ensure that the fluid-impermeable layer remains impermeable during operation and therefore on exposure to high pressure/temperature.

As addressed above, it must also be ensured that the fluid-impermeable layer remains in close contact with the material used for storage.

FIG. 7 shows a cross section of a heat-storage system WSP constructed as in the conventional art. The heat-storage system WSP comprises a solid natural material MAT for storing heat. The heat-storage material MAT is surrounded by a flexible fluid-impermeable layer FUS, a film, in a manner that at least provides pressure-tight isolation of the heat-storage material MAT from the environment of the heat-storage system and/or in relation to the surroundings of the heat-storage system.

Within the heat-storage system WSP in the lower and central region the heat-storage material MAT is supported by a shape-defining basal structure BST which can by way of example comprise vermiculite or Ytong. The shape-defining basal structure BST in essence defines the shape and the volume of the heat-storage material MAT and thus concomitantly determines heat uptake, heat output, and also the temperature distribution in the interior of the heat-storage system WSP.

In the upper region within the heat-storage system WSP, the heat-storage material MAT is surrounded by an insulation DMG arranged between the heat-storage material MAT and the flexible fluid-impermeable layer FUS. The insulation DMG firstly provides close contact between the layer FUS and the heat-storage material MAT and secondly ensures that the heat-storage material MAT does not damage the layer FUS.

The document WO 2017/055475 A1 discloses a plurality of outer layers, among which is an impermeable outer film which is likely to have capability to compensate dimensional changes due to settling of the thermal material.

The document DE 27 21 173 A1 moreover reveals an underground reservoir where a film is provided. However, the film appears to have been fixedly connected to the inside of a thermal insulation layer that is provided, with no provision of compensatory movement.

SUMMARY

An aspect relates to provide a heat-storage system optimized in relation to the fluid-impermeable layer.

An arrangement for storing thermal energy is provided. The arrangement comprises a heat-storage system which is configured in three dimensions and which comprises a solid natural material for storing heat. The heat-storage material is surrounded by a flexible fluid-impermeable layer, in a manner that at least provides pressure-tight isolation of the heat-storage material from the environment of the heat-storage system and/or in relation to the surroundings of the heat-storage system.

Embodiments of the invention provide a flexible outer layer which exerts an areal force onto the flexible fluid-impermeable layer. The flexible fluid-impermeable layer is thus pressed areally onto the heat-storage material, in a manner such that it conforms thereto.

The flexible outer layer either takes the form of a mesh or is conformed as sheet-metal plates overlapping one another in imbricated manner.

The solid natural material for storing heat is also termed heat-storage material.

With the aid of embodiments of the present invention, despite the requirement for high steam parameters (temperature T, power output P), the flexible fluid-impermeable layer is advantageously always optimized to be in close contact with the material used for storing heat.

The volume of the heat-storage material and, respectively, the total volume of the heat-storage system are maintained even when large and sometimes rapid temperature fluctuations occur. Undesired effects in the heat-storage system (e.g. non-uniform temperature distribution within the volume of the storage system or formation of undesired channels in the interior of the heat-storage system or material thereof) are thus avoided.

A fluid (for example air) is used for the transfer of thermal energy to the heat-storage material and for the extraction of thermal energy from the heat-storage material. The heat-storage system has at least one inlet and at least one outlet by way of which the fluid is passed for energy storage and for energy extraction. For energy storage, fluid heated to a higher temperature than that of the heat-storage material is passed by way of the inlet into the heat-storage system, where thermal energy is transferred from the fluid to the heat-storage material. The cooler fluid is passed out from the heat-storage system by way of the outlet. For energy extraction, correspondingly, fluid that is cooler—in comparison to the temperature of the heat-storage material—is passed by way of the inlet into the heat-storage system, where thermal energy is transferred from the heat-storage material to the fluid and the fluid, now hotter, is passed out from the heat-storage system by way of the outlet.

During energy storage, the fluid that is richer in energy than the heat-storage system is passed by way of at least one inlet aperture into the heat-storage system and is conducted therein in a manner such that the fluid heats the heat-storage material. The thermal energy introduced by way of the fluid is thus stored with the aid of the heat-storage material.

The fluid that, after the storage procedure, is accordingly less energy-rich, i.e. cooler, is passed out from the heat-storage system by way of the at least one outlet aperture.

During energy extraction, fluid that is cooler, i.e. less energy-rich than the storage material, is passed by way of at least one inlet aperture into the heat-storage system and conducted therein in a manner such that the heat-storage material heats the fluid. The heat-storage material thus introduces thermal energy into the fluid. The fluid, accordingly, energy-richer after energy extraction, is passed out from the heat-storage system by way of at least one outlet aperture.

BRIEF DESCRIPTION

Some of the embodiments will be described in detail, with reference to the following figures, wherein like designations denote like members, wherein:

FIG. 2 shows, with reference to FIG. 1, another embodiment of the invention;

DETAILED DESCRIPTION

Figure 1:
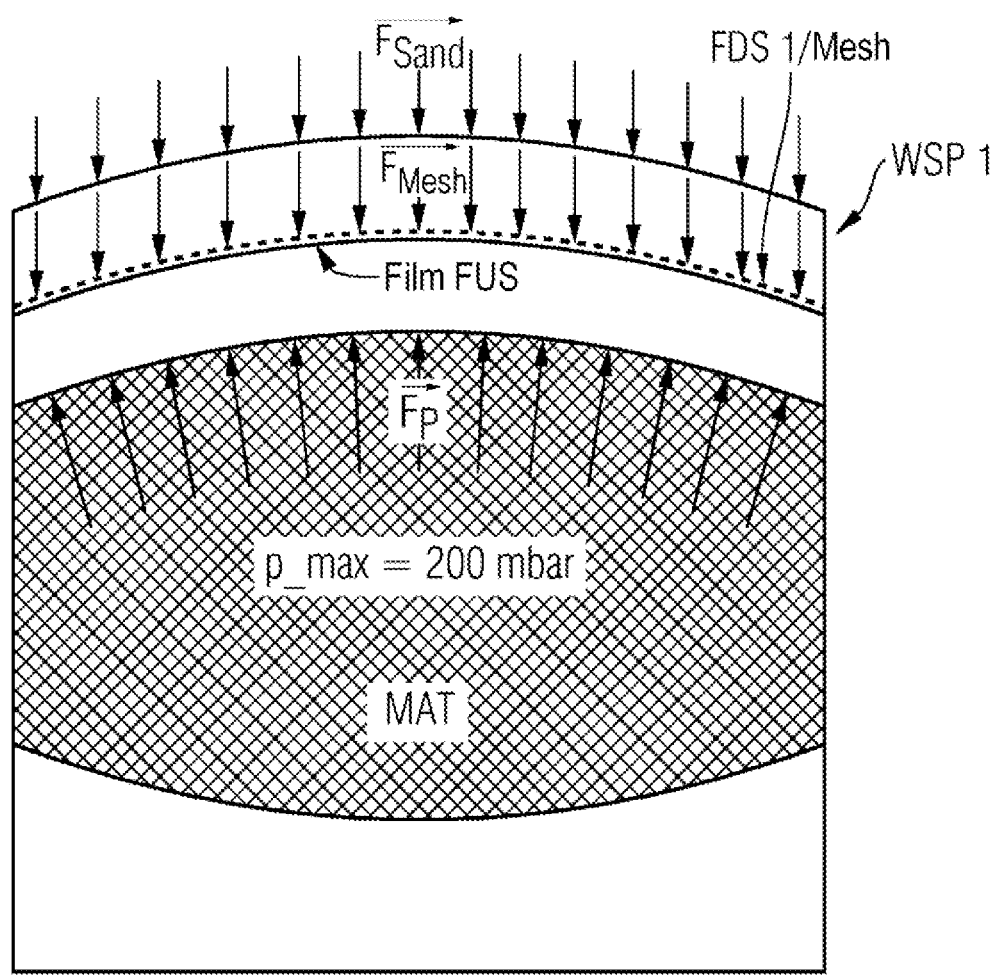
FIG. 1 shows the principles of a cross section of a heat-storage system of embodiments of the invention.

FIG. 1 shows the principles of a cross section of a first embodiment of a heat-storage system WSP1 of embodiments of the invention. Here, and in the figures below, neither the shape-defining basal structure BST shown in FIG. 6 nor the insulation DMG is depicted in detail, but these can have been provided, or can be arranged, at the appropriate locations.

The heat-storage system WSP1 comprises a solid natural material MAT for storing heat. The heat-storage material MAT is surrounded by a flexible fluid-impermeable layer FUS, in this case by way of example a film, in a manner that at least provides pressure-tight isolation of the heat-storage material MAT from the environment of the heat-storage system WSP1.

The resultant pressure during operation by way of example in the interior of the heat-storage system WSP1 is 200 mbar; this finally acts on the film FUS by way of resultant uniformly areally distributed forces $F_p$.

Embodiments of the invention provide a flexible outer layer FDS1 which takes the form of a mesh and which applies an areal force $F_{mesh}$ to the film FUS. The mesh is indicated here as broken line above the film FUS. The film FUS is pressed areally by means of the mesh onto the heat-storage material MAT, and conforms thereto.

The areal force $F_{mesh}$ is generated by way of example by applying a layer made of sand to the mesh, thus generating an areal force $F_{sand}=F_{mesh}$ by way of the intrinsic weight of the sand.

Alternatively, or in addition to the above, the mesh could also have been manufactured from appropriately heavy material (metal) in order to generate an appropriate gravitational force $F_{weight}=F_{mesh}$. The mesh can therefore be a metallic mesh, i.e. manufactured from metal.

The term "mesh" means a meshed system of fibers, cords or wires. The meshed system comprises points of connection at which the fibers, cords or wires have been interlaced with one another. A mesh is an areal structure within which forces become well distributed. Between the fibers, cords or wires that form mesh elements there are vacant spaces or apertures. The configuration of the mesh elements or apertures can by way of example be rhombic, square or hexagonal. It is exemplary that the connections between the fibers, cords or wires at their points of connection are of floating and/or knot-free type. It is thus possible to achieve leveling of different forces in a manner such that, despite said differences, the mesh forms a single uniform areal structure, with no protuberances or indentations.

The mesh is configured with mesh elements sufficiently small to prevent the film from passing through mesh-element apertures.

FIG. 2 shows, with reference to FIG. 1, another embodiment of the invention. In the case of the heat-storage system WSP2 shown here, a mesh FDS2 is pressed onto the film FUS with the aid of an anchoring device (not depicted in any greater detail here, e.g. by means of tension straps, etc.), and not with the aid of a sand layer.

The detail depicts a configuration of the contact between the film FUS and the upward extension of the edge of the heat-storage system WSP2. The film FUS has been additionally shaped (e.g. in the manner of a bulge) in this transition region in order to permit compensation of forces $F_p$ acting thereon. Accordingly, the film FUS is free from the mesh FDS2 in this region.

Figure 3:
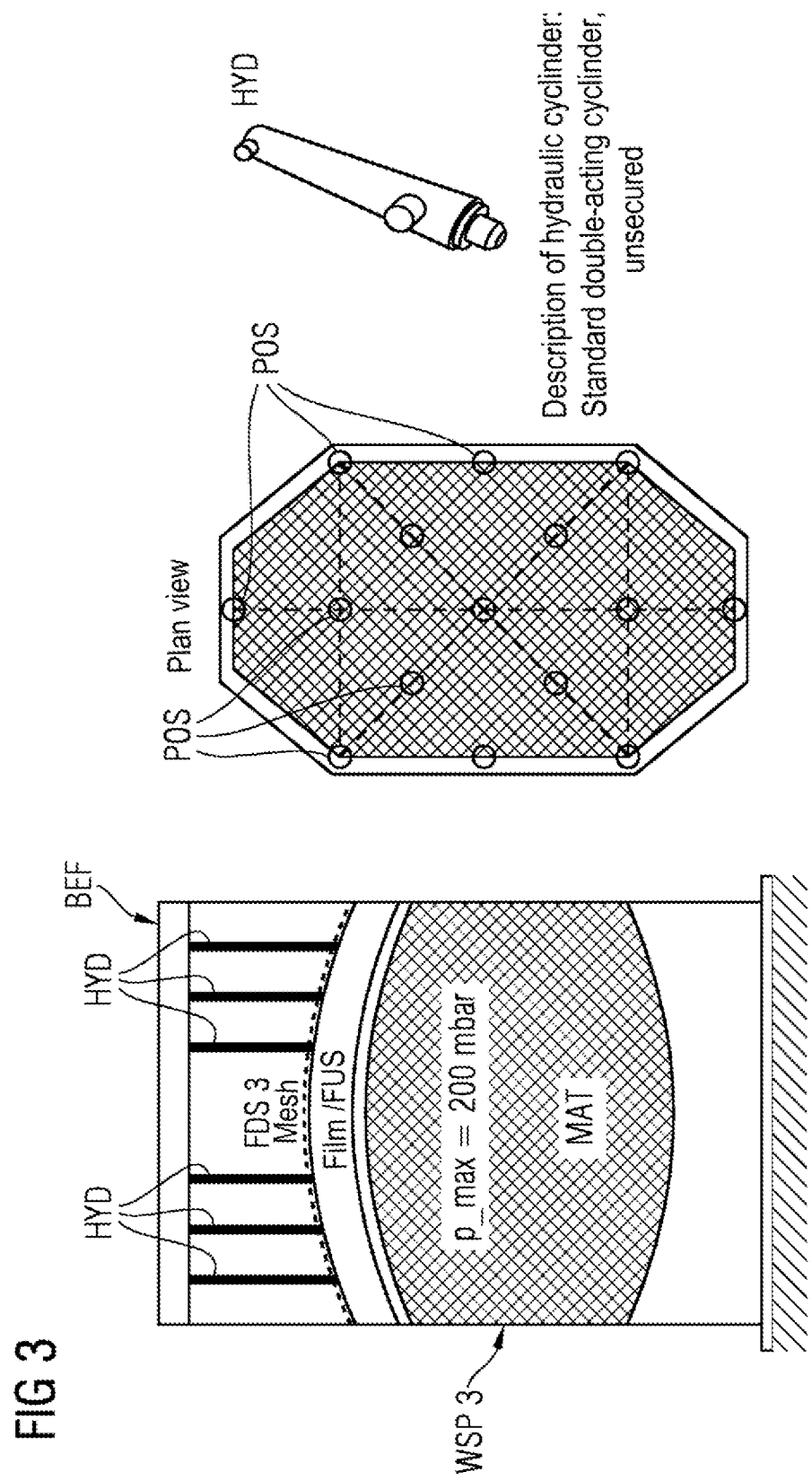
FIG. 3 shows, with reference to FIG. 1, another embodiment of the invention.

FIG. 3 shows, with reference to FIG. 1, another embodiment of the invention. In the case of the heat-storage system WSP3 shown here, a mesh FDS3 is pressed onto the film FUS with hydraulic cylinders HYD, and not with the aid of a sand layer.

The plan view shows respective positioning points POS at which respective hydraulic cylinders HYD have been arranged in order to exert vertically oriented forces onto the film FUS by using one end of the hydraulic cylinder HYD. Correspondingly for this purpose, the other end of the hydraulic cylinders HYD has been secured to securing equipment (e.g. to a top cover of the heat-storage system WSP3).

Figure 4:
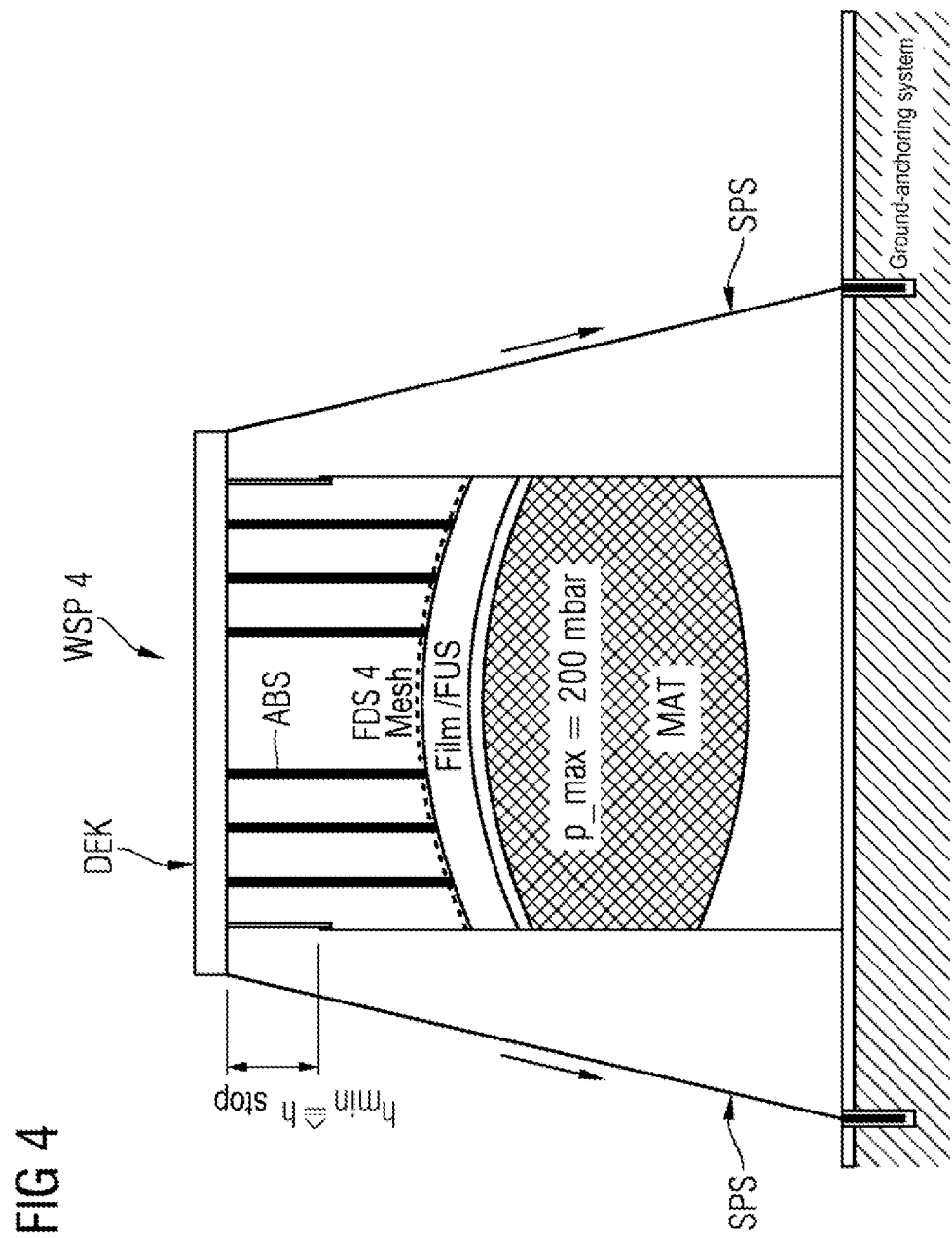
FIG. 4 shows, with reference to FIG. 3, an alternative embodiment of the invention.

FIG. 4 shows, with reference to FIG. 3, an alternative, slightly modified, embodiment of the invention.

In the case of the heat-storage system WSP4 shown here, a mesh FDS4 is pressed onto the film FUS with the aid of a movable top cover DEK of the heat-storage system WSP4, and not with the aid of hydraulic cylinders.

The top cover slides on extensions of lateral edges of the heat-storage system WSP4; the gravitational force exerted by the top cover DEK is increased by use of tension cables SPS.

The position of the top cover DEK with reference to the film FUS, and also the required areal force, is defined by way of the tension cables SPS and with the aid of prefabricated, defined spacers ABS.

Figure 5:
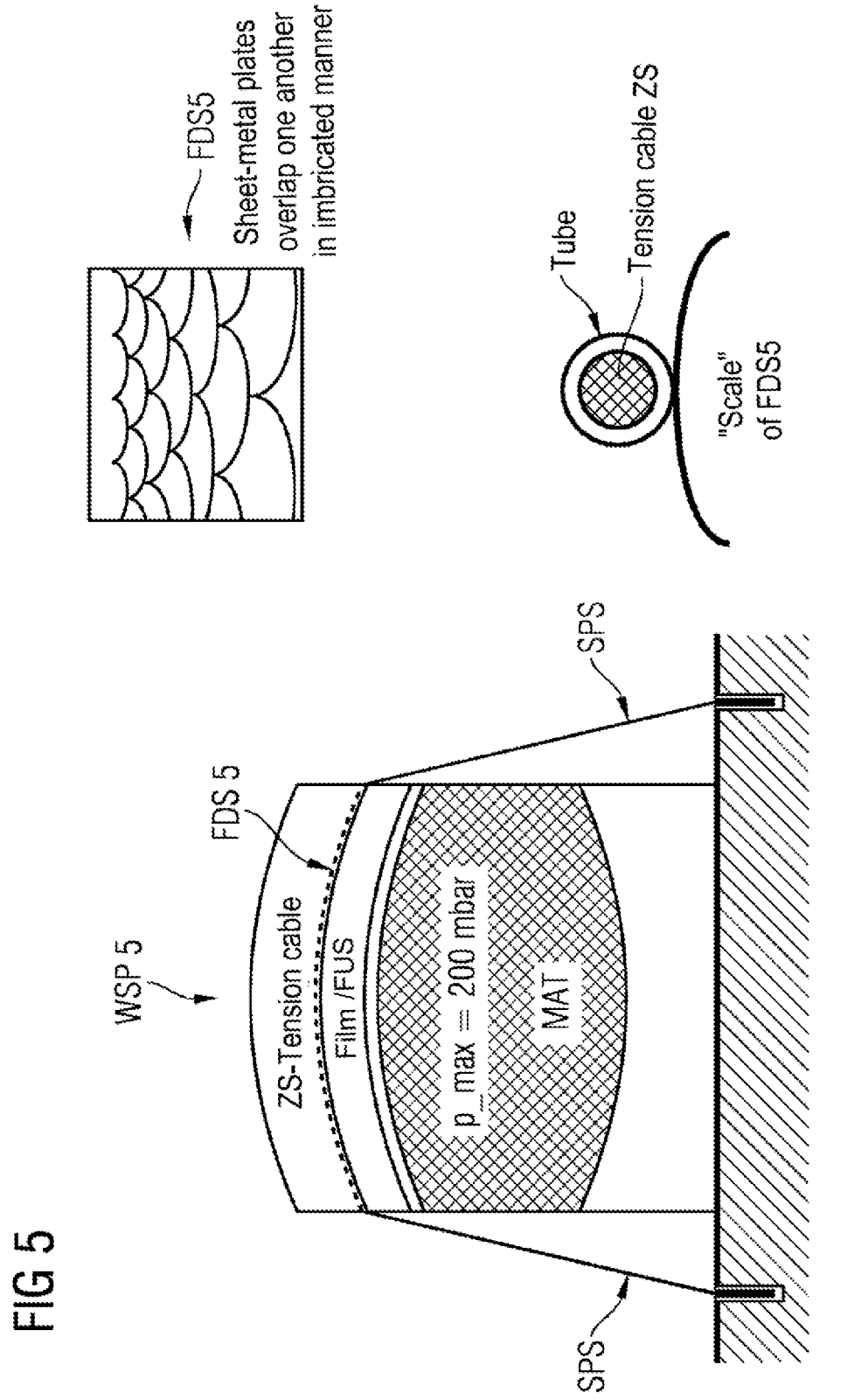
FIG. 5 shows, with reference to FIG. 1, an alternative embodiment of the invention.

FIG. 5 shows, with reference to FIG. 1, another cross section of an alternative embodiment of the invention.

The heat-storage system WSP5 comprises a solid natural material MAT for storing heat. The heat-storage material MAT is surrounded by a flexible fluid-impermeable layer FUS, in this case by way of example a film, in a manner that at least provides pressure-tight isolation of the heat-storage material MAT from the environment of the heat-storage system WSP5 and/or in relation to the surroundings of the heat-storage system WSP5.

In this case embodiments of the invention provide an at least to some extent flexible outer layer FDS5 which simulates scale armor and has sheet-metal plates overlapping one another in imbricated manner—cf. in this connection the detail in FIG. 5.

The film FUS is thus pressed areally onto the heat-storage material MAT, and conforms thereto.

The required areal force is generated by laying traction cables ZS in respective tubes over the scales of the outer layer FDS5. These traction cables ZS are in turn tensioned by way of tension cables SPS in a manner such that the sheet-metal plates FDS5 overlapping one another in imbricating manner exert pressure on the film FUS.

Figure 6:
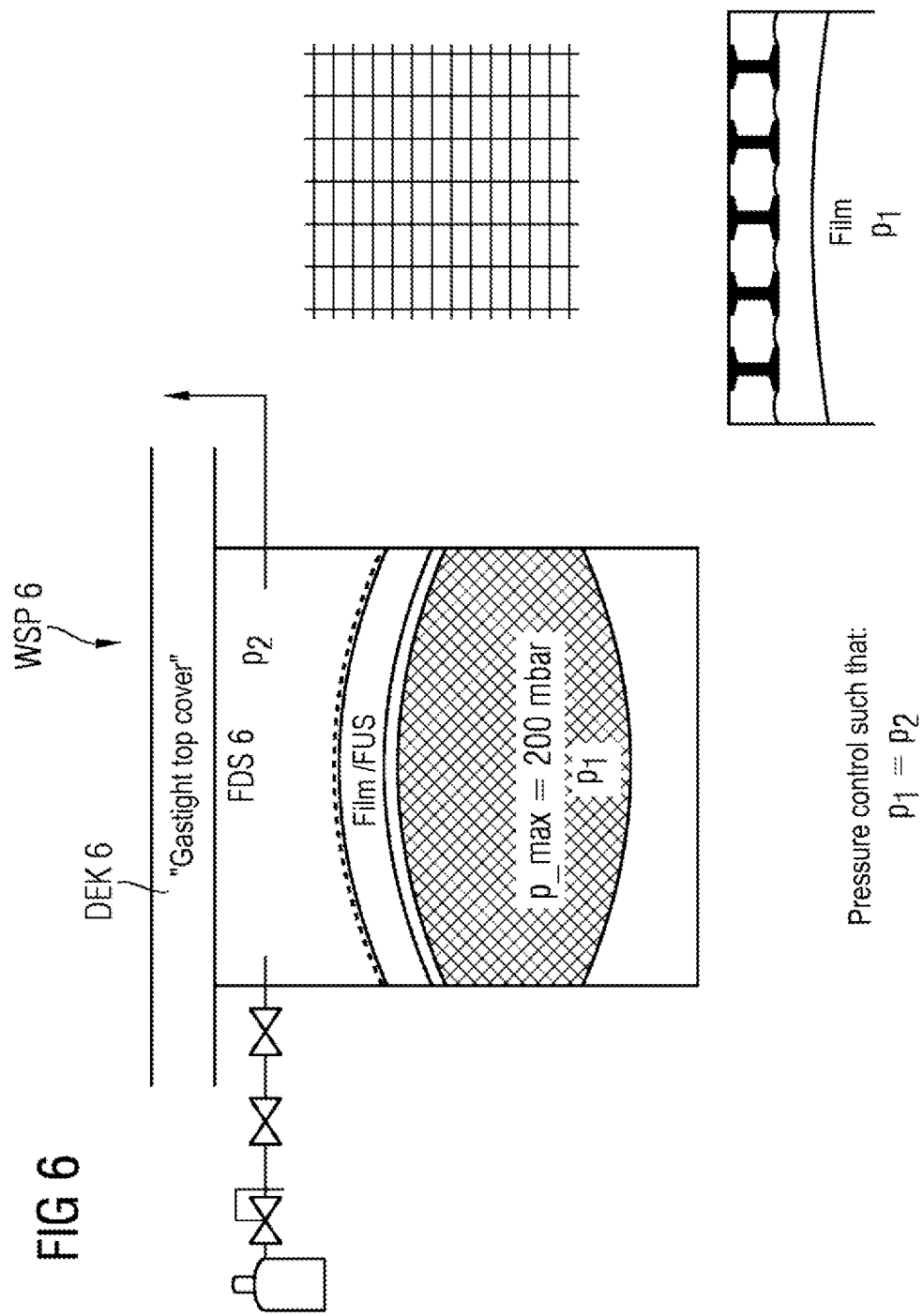
FIG. 6 shows, with reference to FIG. 3, another embodiment of the invention.

FIG. 6 shows, with reference to FIG. 3, another embodiment of the invention. In the case of the heat-storage system WSP6 shown here, a gastight mesh structure FDS6 is pressed onto the film FUS with the aid of gas pressure.

The heat-storage system WSP6 in this embodiment has a gastight top cover DEK6.

Figure 7:
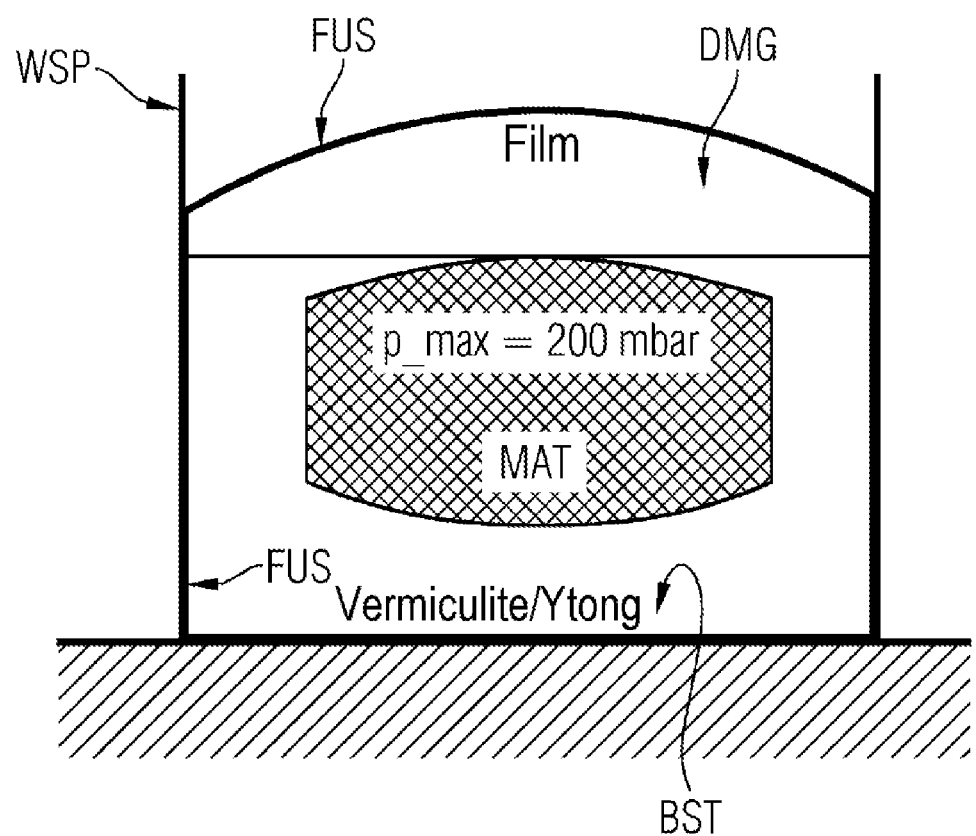
FIG. 7 shows the cross section, described in the introduction, of a heat-storage system constructed as in the conventional art.

FIG. 7 moreover shows the cross section, described in the introduction, of a heat-storage system constructed as in the conventional art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. An arrangement for storing thermal energy, comprising:
a heat-storage system which is configured in three dimensions and which includes a heat-storage material,
wherein the heat-storage material is surrounded by a flexible fluid-impermeable layer in a manner that at least provides pressure-tight isolation of the heat-storage material from the environment of the heat-storage system,
wherein a flexible outer layer is provided, coupled to the flexible fluid-impermeable layer in a manner such that the flexible outer layer exerts an areal force on the flexible fluid-impermeable layer and the flexible fluid-impermeable layer therefore exerts areal pressure on the heat-storage material, and the flexible outer layer takes the form of a mesh, and
in order to generate the areal force, hydraulic cylinders are provided, wherein the hydraulic cylinders are configured to press the flexible outer layer onto the flexible fluid-impermeable layer.

2. The arrangement as claimed in claim 1, wherein the flexible fluid-impermeable layer is a film.

3. The arrangement as claimed in claim 1, wherein, insofar as the flexible outer layer takes the form of a mesh, the mesh is configured as metallic mesh.

4. The arrangement as claimed claim 1, wherein the mesh is manufactured from heavy material.

5. The arrangement according to claim 1, wherein a top cover of the heat-storage system is configured movably in a manner such that the movable top cover is pressed onto the flexible fluid-impermeable layer.

6. The arrangement as claimed claim 1, wherein the mesh is manufactured from metal.

* * * * *